United States Patent [19]
Fergason

[11] 4,188,094
[45] Feb. 12, 1980

[54] LIQUID CRYSTAL DISPLAY HAVING LIGHT INDICIA ON A DARK BACKGROUND

[76] Inventor: James L. Fergason, 5806 Horning Rd., Kent, Ohio 44240

[21] Appl. No.: 877,923

[22] Filed: Feb. 15, 1978

[51] Int. Cl.² .................................................. G02F 1/13
[52] U.S. Cl. .................................................. 350/337
[58] Field of Search .................. 350/337, 334, 338

[56] References Cited

U.S. PATENT DOCUMENTS

| | | | |
|---|---|---|---|
| 3,712,047 | 1/1973 | Girard | 350/334 X |
| 3,814,501 | 6/1974 | Schindler | 350/338 |
| 3,857,627 | 12/1974 | Harsch | 350/337 |
| 4,025,164 | 5/1977 | Doriguzzi et al. | 350/337 |
| 4,068,926 | 1/1978 | Nakamura et al. | 350/337 |
| 4,139,271 | 2/1979 | Yoda | 350/337 |

*Primary Examiner*—Edward S. Bauer
*Attorney, Agent, or Firm*—Thomas H. Murray

[57] ABSTRACT

A liquid crystal display of the twisted-nematic type in which light numerals or other indicia appear on a darker background. This is achieved with the use of three polarizers, one of which covers only the transparent conductive electrode regions in the display forming a desired image.

3 Claims, 1 Drawing Figure

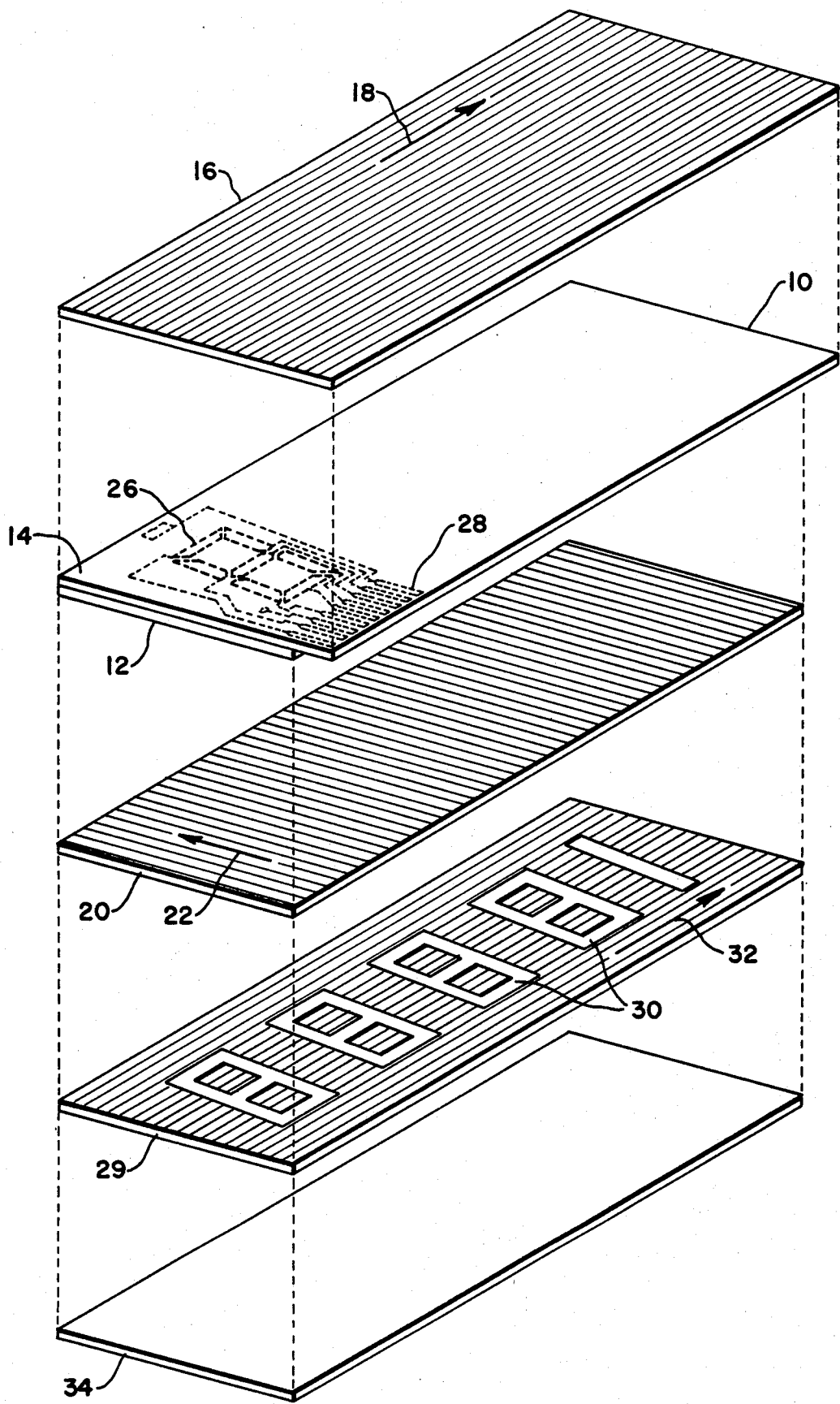

LIQUID CRYSTAL DISPLAY HAVING LIGHT INDICIA ON A DARK BACKGROUND

BACKGROUND OF THE INVENTION

Liquid crystal alpha-numeric displays are now well known and are shown, for example, in U.S. Pat. No. 3,731,986, issued May 8, 1973. Displays of this type comprise a layer of nematic liquid crystal material sandwiched between a pair of parallel transparent plates, the plates being coated on selected areas thereof with transparent conductive material to form an alpha-numeric display. The surfaces of the plates in contact with the liquid crystal material are treated to effect a twisted-nematic structure. Application of an electrical potential between the transparent conductive coatings will cause the nematic structure to untwist. By providing polarizers on opposite sides of the display, polarized light can be made to pass through the structure or be blocked, depending upon whether the polarizers are crossed or parallel to each other.

In alpha-numeric liquid crystal displays of the type described above, two polarizers are employed, one in front of the display and one behind. This results in black or dark numerals on a light background. In certain cases, however, it is desirable to employ a display which has light numerals or other indicia on a dark background. In the past, it has been very difficult to build such a passive twisted-nematic display with light numerals on a dark background, the reason being that the display cannot receive adequate light through the widely-spaced polarizers to give good contrast under all conditions and lighting situations.

SUMMARY OF THE INVENTION

In accordance with the present invention, an alpha-numeric liquid crystal display is provided in which indicia appears light on a dark background. This is achieved by utilizing a third polarizer behind the liquid crystal unit which is crossed with respect to the usual rear polarizer and which is bleached to remove the polarizing film in the areas covered by those transparent conductive strips on the front plate of the display which form selected numerals or other indicia. In this way, polarized light passing through the usual rear polarizer will be continuously blocked by the third, bleached polarizer in all areas except those covered by the transparent conductive strips on the front plate of the liquid crystal display (i.e., the background of the display). Thus, the background appears dark. In the absence of an electrical field applied across the liquid crystal layer in the area of a transparent conductive strip, light will pass through the front polarizer, will be rotated through 90° in passing through the twisted-nematic structure of the liquid crystal layer, and then will pass through the usual back polarizer and finally through a bleached area of the third polarizer to produce a light area on the dark background. However, when an electrical field is applied across the liquid crystal layer, the polarized light will no longer be rotated 90° and will be blocked by the usual back polarizer. Alternatively, the bleached polarizer can be between the liquid crystal unit and the usual back polarizer with the same overall effect. The actuating signals applied to the transparent conductive strips on the front of the display will, of course, have to be complementary with respect to those used on a conventional display in which dark areas appear on a light background.

The above and other objects and features of the invention will become apparent from the following detailed description taken in connection with the accompanying single FIGURE drawing which schematically illustrates one embodiment of the invention in an exploded view.

With reference now to the drawing, there is shown an exploded view of a liquid crystal display, the liquid crystal unit itself being identified generally by the reference numeral 10. The liquid crystal unit includes a back transparent plate 12, a front transparent plate 14, and between the plates a layer of nematic liquid crystal material. As is more fully described in the aforesaid U.S. Pat. No. 3,731,986, the edges of the back and front transparent plates 12 and 14 are sealed to confine the layer of liquid crystal material therebetween. By rubbing the faces of the transparent plates in contact with the liquid crystal material at right angles to each other, or by otherwise producing lines at right angles to each other, the liquid crystal molecules can be made to assume a twisted-nematic structure such that polarized light passing through a polarizer 16 and polarized in the direction of rubbing on the front plate 14 (arrow 18) will be caused to rotate through 90° and can pass through a crossed, back polarizer 20 polarized in the direction of arrow 22.

In order to form an alpha-numeric display, a transparent conductive film on the side of the front transparent plate 14 in contact with the liquid crystal material is etched to form sets of mutually-insulated strips of transparent conductive material, only the first of said sets being shown in the drawing and identified by the reference numeral 26. It will be appreciated that when all of the strips of set 26, for example, are light while the surrounding areas are dark, the resulting configuration will represent the numeral "8". Similarly, by causing selected ones of the strips in set 26 to become opaque, any numeral from 1 through 0 can be made to appear.

The various mutually-insulated conductive strips in set 26 are adapted to be connected through a plurality of mutually-insulated strips of transparent conductive material 28 to external leads, not shown. In this respect, it can be seen from the drawing that the lower end of the forward transparent plate 14 with the strips 28 thereon extends beneath the remainder of the liquid crystal unit 10 in order that a suitable electrical connector can be slipped over the lower portion of the plate 14 to connect the conducting strips 29 to external electrical circuitry, not shown. It will be appreciated, of course, that in most liquid crystal displays, there is a plurality of such sets of conducting strips 26 which form adjacent numerals, although only one set is shown in the drawing for purposes of simplicity.

Behind the first back polarizer 20 is a second back polarizer 29 which has been bleached to remove the polarizing material in areas 30, each of which conforms to the area defined by a set of transparent conductive strips 26 on the front plate 14 of the liquid crystal unit 10 and aligned therewith. The remainder of the polarizer 29, however, still contains the polarizing film; and this film is polarized in the direction of arrow 32 such that it is crossed with respect to the direction of polarization of polarizer 20. Thus, no light will pass through the combination of polarizers 20 and 29. The polarizer 29 may, for example, be bleached by silk-screening onto the areas 30 a gel containing a bleaching agent as is described in copending application Ser. No. 839,672, filed Oct. 5, 1977. Behind the polarizer 29 is a reflective surface 34 adapted to scatter polarized light without depolarizing the same. The reflective surface 34 may, however, be eliminated in the case where the backside of the liquid crystal display unit is illuminated.

Since the polarizing area of polarizer 29 is crossed with respect to the polarizer 20, no light can pass through the two polarizers except in the areas 30 which have the polarizing material bleached away. In these areas, polarized light passing through the front polarizer 16 will be rotated through 90° in passing through the liquid crystal unit 12 and, hence, will pass through polarizer 20 and the bleached areas 30 of polarizer 29 to be scattered back through the unit from the reflector 34. However, when an electrical potential is applied between selected ones of the transparent conductive strips in set 26, for example, and a transparent conductive film on plate 12, the polarized light in the area of any particular transparent conductive strip which is energized will no longer be rotated through 90° in passing through the liquid crystal unit and that segment or strip will apear opaque. The strips which are not energized however, will form a numeral which will appear light on a dark background.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A liquid crystal display in which an image appears light on a dark background, comprising a layer of nematic liquid crystal material of positive dielectric anisotropy sandwiched between transparent parallel plates, films of transparent conductive material on selected areas of the plates and in contact with the liquid crystal material, the plates being treated to effect a twisted-nematic structure such that polarized light will be rotated through 90° in passing through the polarizer, first polarizer means on the front of said display, second polarizer means behind said display covering the entire area of the display except those selected areas defined by the transparent conductive material on one of the transparent plates, and third polarizer means adjacent thereto such that polarized light which passes through said second polarizer means and crossed with respect the transparent parallel plates in areas outside the selected areas will not pass through the second and third polarizer means.

2. The liquid crystal display of claim 1 wherein the films of transparent conductive material on one of said plates are adapted to form alpha-numeric indicia and wherein the selected areas of the second polarizer means are aligned with those selected areas of transparent conductive material on said one plate.

3. The liquid crystal display of claim 1 wherein said third polarizer means is between one of said transparent parallel plates and the second of said polarizer means.

* * * * *